United States Patent

Okamura

[15] 3,649,762

[45] Mar. 14, 1972

[54] AUTOMATIC TELEPHONE-ANSWERING AND MESSAGE-RECORDING APPARATUS

[72] Inventor: Akira Okamura, Tokorozawa-shi, Japan

[73] Assignee: Pioneer Electronic Corporation, Tokyo, Japan

[22] Filed: Nov. 26, 1969

[21] Appl. No.: 880,261

[52] U.S. Cl. ....................................................179/6 R

[51] Int. Cl. ....................................................H04m 1/64

[58] Field of Search ..........................179/6 R, 6 C, 6 TA, 6 D

[56] References Cited

OTHER PUBLICATIONS

Bell Telephone Brochure Estimated Date– 1935

*Primary Examiner*—Robert L. Richardson
*Attorney*—Sughrue, Rothwell, Mion, Zinn & Macpeak

[57] ABSTRACT

An automatic telephone-answering and message-recording apparatus having two functions, one serving to send outgoing messages and the other serving to record the caller's incoming messages after the outgoing message has been sent out be selectively loading two kinds of cartridges the contents of each having separate outgoing messages and having an additional auxiliary operation mechanism for preventing said cartridges from misloading.

The apparatus also has a novel starting control circuit whereby stable operation may be achieved regardless of the calling signal being from any long distance, and a novel beep tone circuit controlled by a Schmitt circuit, for detecting the termination of the recording time of incoming messages as well as the sending of outgoing messages and to then restore the apparatus to its standby state.

12 Claims, 9 Drawing Figures

INVENTOR
AKIRA OKAMURA

BY Sughrue, Rothwell, Mion, Zinn & Macpeak

ATTORNEYS.

INVENTOR
AKIRA OKAMURA

BY Sughrue, Rothwell, Mion, Zinn & Macpeak

ATTORNEYS.

INVENTOR
AKIRA OKAMURA

BY Sughrue, Rothwell, Mion, Zinn & Macpeak
ATTORNEYS

INVENTOR
AKIRA OKAMURA

BY Sughrue, Rothwell, Mion, Zinn & Macpeak
ATTORNEYS.

INVENTOR
AKIRA OKAMURA

BY Sughrue, Rothwell, Mion, Zinn & Macpeak
ATTORNEYS.

INVENTOR
AKIRA OKAMURA

BY Sughrue, Rothwell, Mion, Zinn & Macpeak
ATTORNEYS.

INVENTOR
AKIRA OKAMURA

BY Sughrue, Rothwell, Mion, Zinn & Macpeak
ATTORNEYS.

AUTOMATIC TELEPHONE-ANSWERING AND MESSAGE-RECORDING APPARATUS

BACKGROUND AND SUMMARY OF THE INVENTION

This invention relates to an automatic telephone-answering and message-recording apparatus which contains three fundamental and important features, namely, one feature relates to a device which is adapted to perform two functions—one function is for performing answering operations only and the other function is for performing answering and recording operations in one apparatus. The second feature relates to a starting control mechanism with which the operation of a said apparatus is controlled or a telephone bell signal is received, and the third feature relates to a beep tone circuit and a control means thereof.

There have been previously available two kinds of automatic telephone-answering apparatus, one of which serves for sending out the so called "outgoing message" telling of the subscriber's absence, upon being operated by the calling signal of a caller's party and then for recording the incoming message from the caller (i.e., answering and recording operation), and the other of which serves merely to tell of the subscriber's absence without recording the caller's message (i.e., exclusive use for answering operation). However, an apparatus having both functions in one apparatus is presently unavailable.

Also in the earlier apparatus, the magnetic tape for recording the outgoing message was directly housed in the apparatus without any case or cartridge. Therefore, loading and treatment of the recording tape was not easily accomplished. Thus, if a person wished to change the content of an outgoing message, the other or new message had to be recorded anew on the tape. Accordingly, often the content of the outgoing messages would not be changed although the occasion required it.

In order to obviate the above-mentioned defects present in the earlier devices, the present invention incorporates a series of novel features relating to the abovesaid first group. Namely, in the apparatus of the present invention, which will be described in detail later, two functions, i.e., the exclusive answering operation and the answer and recording operation are able to be conducted in a single apparatus. Further, the prerecorded magnetic tape for the outgoing messages is housed in a cartridge case thus enabling loading and removing of the cartridge easily. Still further, because the content of the prerecorded outgoing message in each cartridge corresponds in form to a related cartridge, it is possible to set the apparatus either for exclusive answering operation or for answer and recording operation by selecting and loading of such a cartridge. Furthermore, if the selection of the magnetic cartridge is wrong, the apparatus operates in a manner entirely different from that which was intended. Therefore, in order to avoid this error upon loading the cartridge, the prerecorded outgoing message housed in said cartridge is adapted to be reproduced in a manual as well as an automatic manner.

Further, when a subscriber is called on the telephone, he usually needs a few minutes to be able to answer his caller after lifting his telephone receiver. Therefore, in the time the caller is completing psychologically and physically the final preparation for his conversation, he is able to listen to the subscriber's answer and to send a message to the subscriber.

In an automatic telephone answer and recording apparatus, however, the outgoing message must be sent immediately without such a preparatory time of a few minutes which is undesirable. Therefore, a starting control device operative after a proper delay time becomes necessary. Several means for this purpose have been proposed. One example, which was proposed by an engineer of the same company as that of the inventor of the present invention and patented by the application Japanese utility model Ser. No. 41-641 (announced Jan. 25, 1966), utilizes a relay which is directly operated by the rectified power of the bell signal, a multivibrator, and a capacitor which may be charged by on-off action of said relay contacts and is connected to the multivibrator circuit. Said multivibrator is operated by the appropriate amount of charged capacity in said capacitor. Thus, said means is operated by the multivibrator after the predetermined charging time of the capacitor. For another example, means having a special transformer which is coupled to the telephone lines and can transmit efficiently bell signals. The transformer has its secondary side provided with two windings, i.e., one is for receiving bell signals and the other is for transmitting messages. In this case, the bell signal is rectified through a diode after being amplified thereby charging a capacitor. After a predetermined charging time of this capacitor has elapsed, a transistor amplifier may be operated by said charged power to thereby operate a relay for actuating said means. However, these starting control circuits have the drawbacks of being complicated and expensive. Furthermore, in the last-named means, the bell signal is amplified by the amplifier, therefore even in the case of a faint bell signal said means can be operated well, but in the first-named means it often has the defect of malfunction. Still further in both above-mentioned means, there exists a little fluctuation of the delay time corresponding to the strength of the bell signal, therefore the exact operation by the constant delay time has not always been achieved.

In order to obviate the second defect of the earlier apparatus, novel means relating to the second system as above mentioned is provided in the present invention. Namely, this means relates to a starting control mechanism through which the operation of the apparatus is controlled as a bell signal is received.

In order to operate the apparatus after a predetermined constant time, without reference to the voltage difference of said signal, said means has a rectifier circuit for rectifying the bell signal, a capacitor which is gradually charged by said rectified output power, and a switch circuit. The switching circuit is operated when the charged voltage reaches a predetermined value and then the apparatus is operated. In this case, further, so as to insure the constant charged voltage, a constant voltage regulator diode is used whereby a higher efficiency may be obtained.

Previously there were automatic telephone answer and recording apparatus which would generate an oscillating tone or beep tone which told the caller to send his message after the subscriber's message was sent, but they were not an apparatus which generated a signal to indicate the termination of the recording time to the caller just before the time was over and before the apparatus was restored to its standby state. For this reason the caller sometimes continued useless conversation and even though the message was not being recorded the caller believed that it had been recorded. Also, the oscillation circuit for sending out the oscillating tone had been actuated by switching over a recording amplifier circuit to the oscillation circuit, however, the proper control of the oscillating circuit was not easy.

In the present invention, in order to obviate the above-mentioned third drawback and to provide a novel feature, the oscillating circuit is controlled by an end mark which is provided on the magnetic tape for outgoing messages or a switch mounted on a timer means by which the total operation time of an apparatus is controlled.

Therefore, a first object of the invention is to provide an automatic telephone-answering and recording apparatus which has two functions, exclusively for answering and answering-recording operation and in which apparatus the selection of these two functions may be done easily and at will.

A second object of the invention is to provide an automatic telephone-answering and recording apparatus wherein a new outgoing message need not be recorded every time, but is able to be recorded on another cartridge before hand, and in which an outgoing message included tape is housed in a removable cartridge case, thereby greatly facilitating its handling.

A third object of the invention is to provide an automatic telephone-answering and recording apparatus which is possible to be set either for exclusively answering operation or for an answering and recording operation by selective loading of cartridges, because the content of the cartridges corresponds to the external form or outline of the related cartridge.

A fourth object of the invention is to provide an automatic telephone-answering and recording apparatus in which, when the cartridge containing the outgoing message is loaded in the apparatus, the operation of the reproduction of said message is conducted at least once manually, and automatically whereby both the contents of the message and the operation corresponding to the contents are able to be confirmed.

A fifth object of the invention is to provide an automatic telephone-answering and recording apparatus wherein the answering operation starts when a predetermined constant time has elapsed after the arrival of a caller's signal, whereby any caller is able to listen to the subscriber's answer under the same psychologically and physically restful conditions as in the case of a general telephone conversation.

A sixth object of the invention is to provide an automatic telephone-answering and recording apparatus including a novel and simpler starting means which begins operating with the arrival of a caller's signal but starts the answering operation when a predetermined nearly constant time has elapsed after the arrival of a caller's signal without regard to the voltage difference of said signal.

A seventh object of the invention is to provide an automatic telephone-answering and recording apparatus which can protect a caller from a continuation of a useless conversation after the termination of the predetermined allocated time is reached.

An eighth object of the invention is to provide an automatic telephone-answering and reproducing apparatus having the feature that any caller is protected from talking in vain by means of an oscillatory tone (so called end tone) which is sent out to the caller when his allocated recording time is nearly terminated and said oscillatory tones are recorded on the magnetic recording tape for the incoming messages whereby the tape is easy to listen to when replayed because of provision of clear end marks.

A ninth object of the invention is to provide an automatic telephone-answering and recording apparatus having an oscillation circuit means whereby beep tones and end tones are generated selectively. A 10th object of the invention is to provide an automatic telephone-answering and recording apparatus having an oscillation circuit provided with a control means whereby a stable oscillatory tone can be generated through a time constant means which can determine the oscillation time of said circuit.

An 11th object of the invention is to provide an automatic telephone-answering and recording apparatus having an oscillation circuit provided with a stable control means whereby the oscillation of the beep tone or the end tone is protected from misoperation.

BRIEF DESCRIPTION OF THE DRAWINGS

With the above and other objects in view, as will be presently apparent, the invention consists in general of certain novel combination of elements and arrangements of parts hereinafter fully described, shown in the accompanying drawings and specifically claimed.

In the accompanying drawings like characters of reference indicate like parts in the several views and.

DETAILED DESCRIPTION OF PREFERRED EMBODIMENTS

Figure 1:
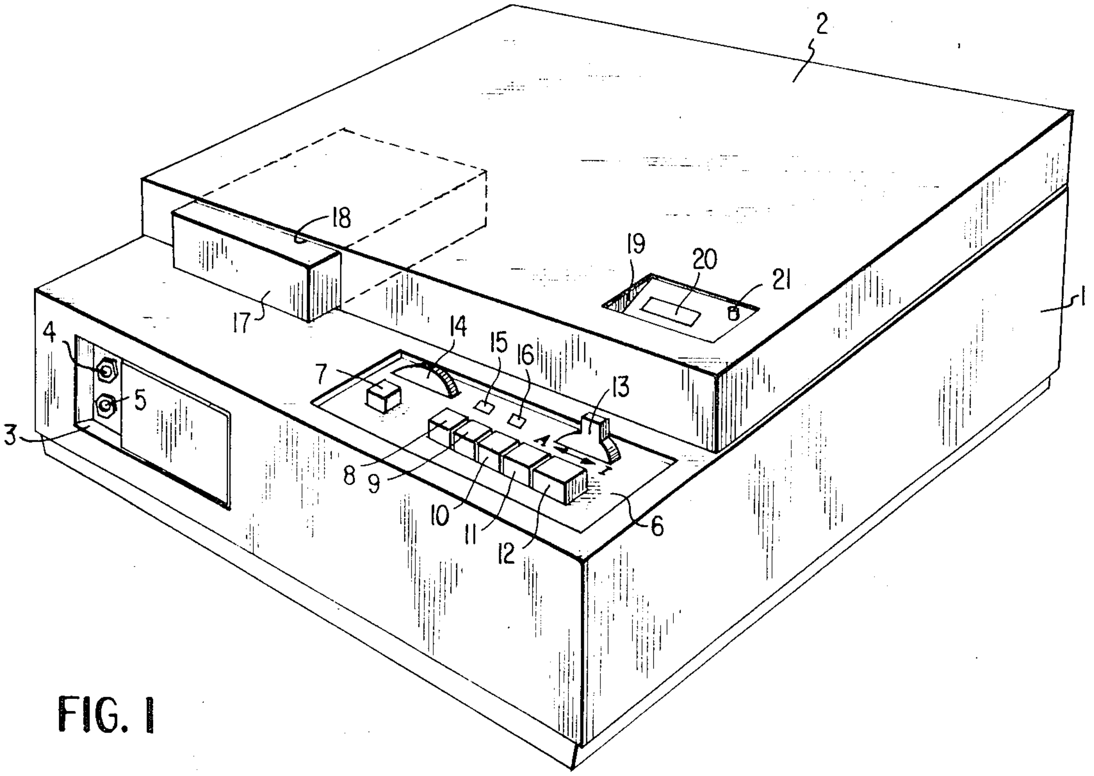
FIG. 1 is a perspective view of an automatic telephone-answering and message-recording apparatus of the present invention, showing the relative position of various major elements thereof.

Referring to FIG. 1, numeral 1 is a housing and numeral 2 is a removable cover which covers over various parts and elements mounted on the housing 1. The front part of the housing 1 is provided with an opening 3 through which a microphone jack set 4 and an earphone jack set 5 are located. The upper front part of the housing 1 is also provided with an opening 6, through which control buttons, a control lever, a knob and pilot lamps are positioned. Control buttons 7, 8, 9, 10, 11 and 12 by which the various operations of the apparatus are controlled are a "start," "stop," "recording" (for recording an outgoing message on magnetic tape), "automatic answering," "playback,"c and "telephone conversation-buttons" respectively. A rewinding lever 13 serves for rewinding the magnetic tape on which an incoming message is recorded when the incoming message is desired to be reproduced. A knob 14 is employed to adjust the record-level on the magnetic tape when any outgoing message is recorded thereon. A "power indicating lamp" 15 is employed to indicate that the electric power is being supplied to the apparatus, and an "operation indicating lamp" 16 is provided to indicate that the apparatus is now in the "operating condition," but not in the "standby condition."

On the upper portion of the housing 1 is mounted an outgoing message-prerecorded cartridge 17 which is inserted almost entirely in the cover 2 through an opening 18 provided in the front portion of the cover 2. On the upper surface of the cover 2 is provided an opening 19, through which a "cycle counter" 20 and a pushbutton switch 21 are presented, the former serving to indicate the number of received incoming messages during "autoanswering" operations, and the latter serving to return the cycle counter 21 to zero.

II GENERAL MECHANICAL PARTS

1. Recording and Reproducing Mechanisms for Outgoing Messages

The magnetic tape-deck for outgoing messages in FIG. 2 will be described. The above-mentioned magnetic cartridge 17 houses an endless tape therein; and at its outer forward surface provides openings through which the magnetic tape is engaged with a magnetic head H1, a control pole P1 and a capstan 22. The magnetic cartridge 17 also carries a pinch roller therein (not shown). The magnetic tape cartridge 17 is free to be loaded on and removed from the apparatus. The mechanism for holding the cartridge 17 in the apparatus is shown in FIG. 3, but its detailed description will be omitted because mechanism is not an essential part of the present invention.

The magnetic tape cartridge 17 is of two types, one 17-1, permits the apparatus to achieve two essential functions that of reproducing prerecorded outgoing messages and recording incoming messages and the other 17-2 permits the apparatus to reproduce incoming messages only. These two types of cartridges are identified by their exterior features; i.e., the former 17-1 is shaped to press a sensing lever 23 for closing a switch MS5 and the latter 17-2 has a corresponding recessed surface to receive the sensing lever 23 so as not to press the same, leaving the switch MS5 opened.

Figure 4:
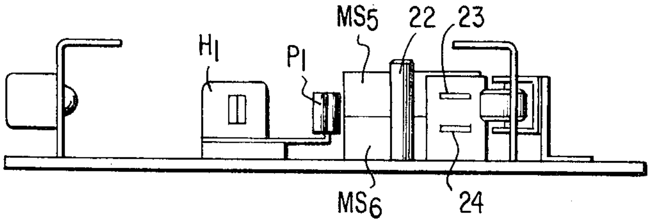
FIG. 4 is a side view of the holding means of FIG. 3 with the magnetic tape cartridge removed.

A sensing lever 24 viewed in FIG. 4 is provided under and parallel to the sensing lever 23 to press the switch MS6 located under the switch MS5. The switch MS6 is adapted to supply electric power only when the cartridge 17 is loaded in position.

2. Recording and Reproducing Mechanism for Incoming Message

The recording and reproducing mechanism for incoming message is almost the same as that of the ordinary magnetic tape recorder. That is, in the mechanism are provided two reels 25 and 26, on and through which the magnetic sound tape is supplied and taken up respectively. Reference character H2 indicates a magnetic head unit comprising a recording and reproducing head element RPH2 and an erasing head element EH2 therein (FIG. 5), Numeral 29 and 28 indicate a capstan and a pinch roller respectively. The pinch roller 28 is mounted on a lever 29 and during an operating cycle is pressed into engagement with the capstan 27 as a plunger SD1, included in the housing 1 (shown in FIG. 5) is attracted by magnetic force. Numeral 30 indicates relays which will be described next in the detailed description of the circuit diagram.

III CIRCUIT DIAGRAM

1. Summary

Now referring to FIG. 5, the schematic circuit arrangement of the apparatus in accordance with the invention will be discussed.

The circuit arrangement of the apparatus is generally composed of a recording and reproducing circuit means, a control means, a driving circuit means and a supplying circuit means.

The control means comprises a starting-control circuit, a beep-tone and end-tone generating circuit and an operation checkup circuit. The driving circuit means comprises a motor circuit and a timer circuit. The supplying power circuit means comprises a B-source circuit.

Figure 2:
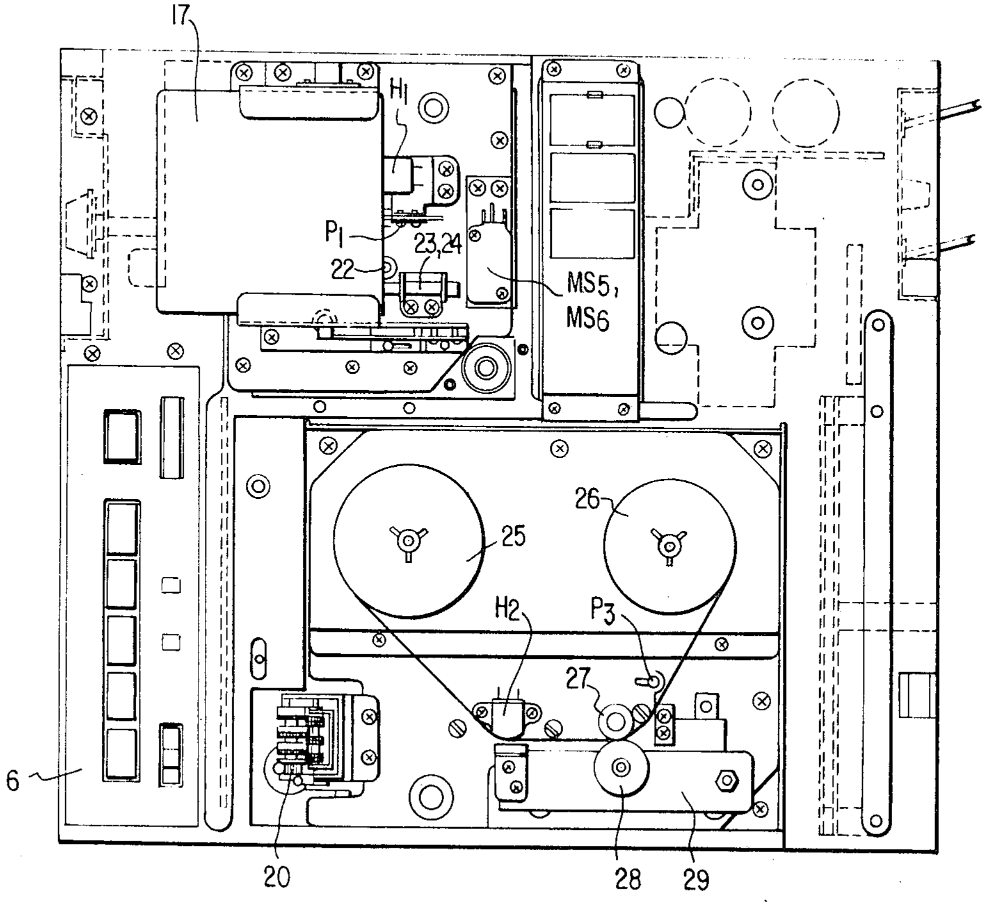
FIG. 2 is a plan view of the apparatus in FIG. 2, with the cover being removed.
Figure 3:
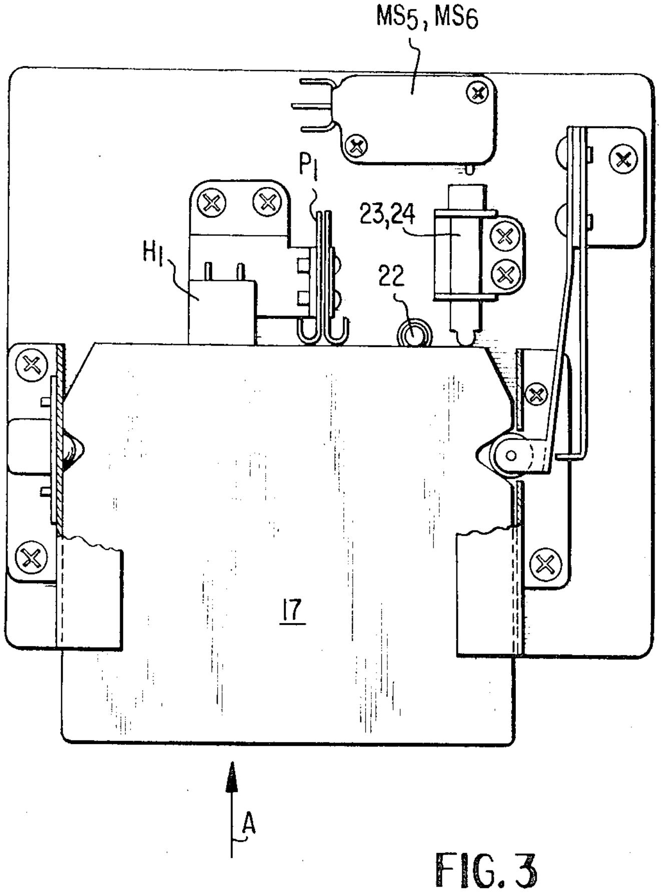
FIG. 3 is an enlarged view of a part of the apparatus in FIG. 2, showing particularly a holding means for the loaded magnetic tape cartridge with outgoing messages.

The general explanation of the symbols used in the diagram is as follows:

TR: transistor, REC; rectifier, D; diode, R; register, C; condenser, T; transformer, M; motor, YA, YB, YE; relays, SD; plunger, $a_1$, $a_2$ ...; switches of relay YA, $b_1$, $b_2$ ...; switches of relay YB, $e_1$, $e_2$ ...; switches of relay YE, RPH, EH; recording and reproducing head and erasing head respectively ($H_1$ is a head unit as above-mentioned in FIG. 2 and FIG. 3 which includes the record and reproducing head element $RH_1$ and the erasing head element $EH_1$ together therein, and $H_2$ is also a head unit including the record and reproducing head element $RPH_2$ and the erasing head element $EH_2$ together therein). Reference characters $ST_1$, $ST_2$ ... are switches of start button 7, PS1, PS2 ...; switches of stop button 8, PT1, PT2 ...; switches of recording button 9, PA1, PA2 ...; switches of playback button 11, PC1, PC2 ...; switches of conversation button 12, RA, RI,; switches of lever 13 for autorewinding use (the side A as arrowed in FIG. 1), and for instant rewinding use (the side I as arrowed in FIG. 1) respectively.

Further, as for contacts of each switch in the present figure (FIG. 7), the following notation will be disclosed, letter N; the common (neutral) contact of the switch, U; the contact indicated on the upper side of contact N, D; the contact indicated on the down side, R; the contact indicated on the right side, and L; the contact indicated on the left side. One of expressional forms of these switch contacts is sometimes one like, for example,—"PC1-N" for a common contact N of conversation switch PC1.

The circuit diagram indicates the apparatus is in nonoperating condition, with no electric power being supplied thereto.

2. Telephone circuit Connection Section

It will be assumed that the apparatus is initially connected to the telephone lines, so the operation will be performed as follows. The letter T1 indicates a transformer which serves both as an output and an input transformer, i.e., it serves to send out the outgoing message to the telephone lines and also to receive the incoming message into the recording amplifier section in the automatic answering condition of the apparatus. For explanatory convenience, the telephone side of the transformer $T_1$ is designated as the primary side, and the amplifier's side as the secondary side thereof. Telephone line $L_1$ is connected to a common contact N of a switch $e_1$ of the relay YE, and in the case of the nonoperative condition of apparatus, in turn through condenser $C_1$ to a common contact N of the autoanswering button switch PA1. In turn, when the autoanswering button 10 is not depressed, the common contact PA1-N is connected, through a resistor R1 to a primary side terminal $t_1$ of the transformer $T_1$ shown in the circuit diagram. The other terminal $t_3$ of the primary of the transformer $T_1$ is connected directly to the telephone line $L_2$. When the switch $e_1$ is changed over, the telephone line $L_1$ is connected directly to the primary terminal $t_1$ of the transformer $T_1$. When the autoanswering button 10 is depressed, the connection of the contact PA1 is changed over to the side opposite to that shown in the diagram. Therefore the telephone line $L_1$ is connected through the switch $e_1$ to an input terminal RE1 of the rectifier REC1. The rectifier REC1 is arranged in a bridge connection with four diodes, and the other input terminal RE3 is connected through a capacitor $C_2$ to the terminal $t_3$ of the transformer $T_1$.

3. Starting Control Circuit

The rectifier REC1 rectifies the incoming bell signals during a telephone call. Between the output terminals RE2 and RE4 of the rectifier REC1 are connected in parallel with a capacitor $C_3$, resistor $R_6$, and contact voltage diodes 2DI. Further, the output terminal RE4 of the rectifier REC1 is connected in series through diode $D_1$ and resistor $R_7$ to variable resistor VR1. The diode $D_1$ is connected in the direction to pass current.

The other output terminal RE2 of the rectifier REC1 is connected through a resistor $R_8$ shunted by a condenser $C_4$ to the output terminal CN-1 of the variable resistor VR1. The last-named terminal CN-1 is further connected through a diode $D_2$ which is placed in the direction of current flow, to the base of transistor TR1. The transistor TR1 and a transistor TR2 connected directly with the transistor TR1 constitute a "Schmitt Circuit" together with resistors $R_{10}$, $R_{12}$, $R_{13}$ in unison: i.e., a resistor $R_{10}$ having its one terminal connected to the base of transistor TR1 and a resistor $R_{12}$ having its one terminal connected to the base of transistor TR2 both resistors are connected at their other terminals to one terminal of the capacitor $C_4$ with the other terminal of $C_4$ connected to the diode $D_2$ as above mentioned, and further these are connected to the so-called "−B" line.

The emitters of transistor TR1 with that of transistor TR2 are grounded through resistor $R_{13}$ which is shunted by capacitor $C_{13}$. The collector of transistor TR2 is connected through a relay YA to "−B" line. The base of transistor TR1 is connected through resistor R9 which is shunted by condenser $C_5$ to a switch $b_2$ of the relay YB, and is further connected through resistor $R_{12}$ to a microswitch MS3 of a time-limiter. The base of TR2 is connected to one terminal of the start button switch $ST_2$ and also to that of the stop button switch PS1.

4. Beep Tone Circuit

A circuit composed of transistors $TR_3$, $TR_4$, $TR_5$ and $TR_6$ represented here is designated as the "beep tone circuit." Its function will be described in detail hereinafter. The apparatus is operated upon reception of the calling signal and after the predetermined outgoing message is sent to the caller. The beep tone is sent to the caller as a signal indicating that the apparatus is ready to record the caller's messages. This signaling tone is called the "beep tone." When the magnetic tape for outgoing messages has completed one cycle of its operation, the contacts $P_1$ viewed in FIG. 2 and 3 are short circuited by a conductive strip provided at the end of the magnetic tape, so that the beep tone circuit is energized and in operation. In the diagram, one pole of contacts $P_1$ is grounded and the other pole thereof is connected through diode $D_3$ to the base of transistor $TR_3$, through diode $D_8$ to the common contact N of the start button switch $ST_2$ and through diode $D_4$ to the base of transistor TR8.

The transistor TR3 and TR4 also constitutes a "Schmitt circuit" together with resistors R15, R16, R17 and R18. An oscillation circuit including the transistor TR5 is connected to the "Schmitt circuit" to serve as the load circuit thereof. The input side of diode D3 is connected through resistor R14 shunted by capacitor C6 to "−B" line. Such a combination of resistance R14 and capacity C6 is responsible for the time constant that regulates the oscillation time of this beep tone. The collector circuit of transistor TR5 has an oscillation transformer T2. The primary winding of the transfer T2 is shunted by capacitor C7 and the secondary winding thereof is shunted by a series connected load resistor R22 and variable resistor VR2. The oscillation energy is fed back from the secondary winding of oscillation transformer T2, through capacitor C8 to the base of transistor TR5. The electric constants of these elements in the oscillation circuit determine the frequency of the circuit. This frequency is generally selected at about 800 c./s. of audiofrequency. The output power of the oscillation circuit is supplied through capacitor C9 which is connected to the secondary side of oscillation transformer T2, to the base of transistor TR6. The transistor TR6 constitutes an amplifier circuit with resistors R23, R24, R25, R26, R27, and R28, and capacitors C10 and C11. The output power of the amplifier is supplied through capacitor C11 and resistor R28 which are connected in series to the collector of transistor TR6 to the common contact N of "conversation" button switch PC1. The switch PC1 continues the connection through its contact U to the secondary terminal $t4$ of transformer T1, unless the "conversation" button is depressed. With this beep circuit, the apparatus of this invention can send out the beep tone which is the signal or tone by which a caller is warned that his message recording time is over and the apparatus is near being returned to stand by for the next operation.

5. Operation confirming circuit

An operation confirming circuit is provided for confirming whether the device may operate well or not when the "autoanswering" button 10 is depressed, by means of reproducing the outgoing message and testing whether the operational condition of the device and the contents of outgoing message are proper. This circuit is composed of the Schmitt circuit including transistor TR7 and TR8 and also a relay $Y_B$ which is actuated by the last-mentioned circuit. By actuation of the relay YB, the above-mentioned starting control circuit is turned on, the Schmitt circuit, including transistors TR1 and TR2 are operated, and the device is set for the reproducing condition of the outgoing message. As the starting control circuit has been described before, the relation between the circuits including transistor TR7, TR8 as well as the relay YB, and the starting control circuit will be described as follows.

The base of transistor TR7 is connected with resistors 29 and 30, and capacitor C12, the other terminals of capacitor C12 and of resistor R30 are grounded together. The collector of transistor TR7 and the base of transistor TR8 are connected directly with each other and also connected with resistor R3 and diode D4. The input side of diode D4 is connected to a contact P1 and the terminal of resistor R31 and that of resistor R29 are connected with contact V of the "conversation" button switch PC4 and contact N of the "automatic answering" button switch PA3. The contact N of switch PC4 is connected through resistor R120 to the winding of eraser head EH2. The contact D of switch PC4 and the contact D of "switch" PA3 are also connected with the "−B" line.

The emitters of transistor TR7 and TR8 connected directly with each other and are grounded through a parallel circuit composed of capacitor C14 and resistor R32.

The above-mentioned transistors TR7 and TR8, resistors R30 and R32, and capacitor C14 all together constitute the "Schmitt circuit." The load for this Schmitt circuit, i.e., the collector circuit of transistor TR8 is connected through the relay YB to the "−B" line, the relay YB being shunted by a capacitor C115. A contact $b1$ of the relay YB is connected to the output circuit of the reproducing amplifier and the other contact $b2$ thereof is connected to the base circuit of transistor TR1.

6. Driving Circuit and Electric Power Source Circuit

The driving circuit section will be described in connection with the so-called electric power source circuit. One of the AC lines is connected through a fuse F to the aforesaid button switches PA8, PT8, DC8 and PP8 respectively. The output side contacts R of switches PA8 and PT8 are connected directly with each other, and then connected with a terminal $t7$ of primary side of power transformer T7 through a microswitch MS6 which is operated by loading of the cartridge, while the output side contacts R of switches PC8 and PP8 are directly connected to the terminal $t7$. The other terminal of the AC line is connected to one of the other terminals, e.g., a 100 v. terminal $t8$ of the secondary side of transformer T7. This terminal $t8$ is connected with a driving motor M1 for the outgoing message, a driving motor M2 for the incoming message, a motor M3 for the time limiter, a plunger SD1 for pressing the pinch-roller for the coming message against the capstan, a plunger SD2 set in the time limiter for operating microswitches MS2 and MS2, and a neon lamp NL2 circuits, wherein each circuit is connected in parallel relation. Return paths of these circuits are alternatively connected through series connected switches $a4$ and $a3$ of relay YA, and through series connected switches $a3$, MS2 and MS5, to the common terminal $t7$ of the primary side of power transformer T7. Between terminals $t7$ and $t8$, a neon lamp NL1 is connected for indicating that current is flowing and a resistance R113 is connected in series relation with the neon lamp NL1.

The aforesaid drive circuit will now be described in further detail. The driving motor M1 for the outgoing message is connected to a contact $a4$-L of relay YA the other contact $a4$-R of relay YA is connected with the motor M2 for the incoming message, conversation button switch contact PC7-L and playback switch contact PP6-N. The circuit of the plunger SD1 is completed by connecting the terminal $t8$ of power transformer T7 through resistor R117, diode D7, plunger SD1 which is shunted by capacitor C117, contact b4 of replay YB and contact RT1 of rewind lever switch 13 to contact $a4$-R of relay YA. A capacitor C114 is connected between contact $a4$-R of relay YA and a juncture of plunger SD1 with diode D7. The juncture of the switch $b4$ with RI1 is connected to contact PR6-R of the playback button switch PP7.

The contact $a4$-N of relay YA is connected with the playback button switch contact PP7-R, and other contact PP7-N is connected with the conversation button switch contact PC7-R. The contact PCN-7 is connected to the playback button switch contact PP6-L and the automatic answering button switch contact PA7-N, and is also connected through the switch $a3$ of relay YA which is shunted by the serially connected microswitches MS2 and MS5, to the terminal $t7$ of power transformer T7. The contact PA7-N is connected through resistor R116 to neon lamp NL2. The contact PA7-L is connected through contact $b3$ of relay YB to motor M3 and microswitch MS4.

The circuit of plunger SD2 is made by connecting the terminal $t8$ of power transformer T7 through stop button switch contacts PS5-D, contact PS5-N, plunger SD2 shunted by capacitor C113, diode D5, resistor R115 to the movable contact of aforesaid microswitch MS4. The junction of plunger SD2 with diode D6 is connected through resistor R114 to contact PS5-U.

The microswitches MS4 and MS3, the latter of which is connected to the base of transistor TR1, may be actuated by a time motor as will be described later.

The secondary side of power transformer T7 is connected to the rectifier circuit REC2, whereby the rectifier output power is fed between the base and the collector of transistor TR20, which circuits serves to provide the constant voltage source circuit. The emitter of transistor TR20 is the output terminal for supplying the B-power to general circuits, said output terminal being connected to the so called "−B" line. The "−B" line is connected through relay YE and microswitch contacts MS1-L-N to ground. The contact MS1-L serves to ground the output of transistor TR6 through contact MS1-N as already described in the beep tone circuit.

7. Recording and reproducing circuits

The recording and reproducing circuits comprise a recording amplifier and a playback (reproducing) amplifier, however these amplifier circuits themselves will not be described in detail, because they are conventional amplifier circuits. However, the relation between these circuits and control parts such as pushbutton switches, relays and the like will be described as follows:

Magnetic heads RPH1 and RPH2 are connected in series and their junction is grounded. The magnetic head RPH1 is for the outgoing message, and its terminal is connected to a contact PT3-N of the "Text Record" button switch. The magnetic head RPH2 for the coming message has its terminal connected to a "playback" button switch contact PP1-D, an "automatic answering" button switch contact PA2-N and a "conversation button" switch contact PC3-N.

Contact PT3-D is connected to contact PP1-U, and contact PP1-N is directed to the input terminal PL1 of the playback amplifier. The playback amplifier comprises a preamplifier and main amplifier. The preamplifier has its output terminal PL2 connected to the input terminal of the main amplifier through a playback button switch contacts PP2-U and PP2-R. The output terminal PL5 of main amplifier is connected through text record button switch contacts PT5-N-D, earphone jack, autoanswer button switch contacts PA5-N-D to the speaker SP. The contacts PT5-D and PA5-U are connected together through resistor R121 to the ground side of the earphone jack and the speaker SP the grounded sides then being grounded together. Contact PA5-D is connected to contact *b*1-U of relay YB through resistor R122.

While the aforesaid contact *a*1-R is connected to an automatic answering button switch contact PA4-U, and contact *a*1-L is connected to contact PA4-N, contact PA4-D is connected through contact $b_1$-N and $b_1$-D to the junction of resistors $R_2$ and $R_3$ which are connected in series between the secondary terminal $t_5$ and $t_6$ of transformer $T_1$.

Input power for the recording amplifier, i.e., for the incoming messages, is supplied from the midpoint of series resistor $R_4$ and $R_5$ connected between terminals $t_4$, $t_6$ of transformer $T_1$ through text record button switch contacts PT1-R-N to the amplifier input terminal REA1, and output power thereof is supplied from a terminal REA2 to autoanswering button switch contact PA2-R and conversation button switch contact PC3-R together.

Now the B-circuit of these amplifiers will be described. The B-source of the preamplifier is supplied from the −B line through "conversation button" switch contacts PC2-N, PC2-N, relay YA switch contacts $a_2$-N, $a_2$-L and "text-record" button switch contact NL, to a "−B" terminal $PL_3$ of the preamplifier. The B-source of the main amplifier is also supplied through text record button switch contacts PT6-N, PT6-R, to a "−B" terminal PL4 of the main amplifier. The right side contact $a_2$R of the contact $a_2$ is connected through relay switch YE-$e_2$ to contact PC2-R, whereby the B source is supplied to a "−B" terminal PEA3 of the recording amplifier.

IV. OPERATION

1. General

With the apparatus of this invention, electric power may be supplied by selectively depressing record button 9, autoanswer button 10, playback button 11 and conversation button 12, thereby closing the switch PT8, PA8, PP8 and PC8 respectively.

The operational procedure will be discussed when the autoanswer button 10 is in the depressed state. In this case there are two types of operation: Namely, one is for the opened state of the microswitch MS5 and the other is for the closed state thereof, upon selective loading of two kinds of magnetic tape cartridges 17 in the apparatus, as above mentioned in the item of "Recording and reproducing mechanism for outgoing message." On the tape of the former cartridge is recorded a text such as: "This is Mr. so-and-so, tel. No. 000 speaking. I am out now. Please call back in one-half hour," and on the tape of the latter cartridge is recorded, for example, "This is Mr. so-and-so (tel. No. 000) speaking. I am out now. But the tape for recording your message is set, so please speak into my autoanswering telephone now." Hereinafter the former will be denoted as "answering, exclusive use" and the latter as "answer and recording use."

2. Confirming Operation for the Automatic Answering

Because of the existence of the two kinds of cartridges as described, an automatic confirmation of the operation of the apparatus in accordance with the invention is needed for preventing the cartridges from being improperly used when the apparatus is operated as the autoanswer service.

Now let us assume that the cartridge 17 for "answering exclusive use" is loaded in the operative position through the opening 18 of cover 2, so the microswitch MS5 is closed, and the microswitch MS6 is also closed by pressing against the forward end of the cartridge. Then, when the autoanswering button is depressed, contacts PA1 to PA8 throughout are changed over to the position opposite to the diagram as viewed in FIG. 5. Electric power is supplied through switch contacts PAS, and further the corresponding circuits will be established as follows:

a. With changing over of Switch PA1

Telephone line $L_1$ (primary side of transformer $T_1$ -relay switch YE-$e_1$ - switch PA1 - terminal RE1 of rectifier REC1.

b. With changing over of switch PA2

Ground - heat $RPH_2$ - switch contacts PA2 - N - R - recording amplifier terminal RE2.

c. With changing-over of switch PA3

"−B" line -switch contacts PA3-P-N - resistor R29 - base of transistor TR7.

d. By changing over of switches PA4 and PA5, the output circuit connection of playback amplifier is changed as will be hereinafter described.

e. By changing over of switch PA7, switch contact PA7-N is connected with contact PA7-L. When the power source is supplied through switch PA8 and transformer T7 to the power rectifier circuit, the P2 current is generated and supplied through the −B line and the before-said (C) route to the capacitor C12, which capacitor is connected to the base of transistor TR7, and the capacitor C12 is first charged, whereby the base of transistor TR7 instantaneously becomes grounded. And then the condition between the emitter and collector of transistor TR7 becomes a nonconductive state or "off" state, while the condition between the collector and emitter of transistor TR8 becomes a conductive or "on" state. This causes the transistor TR8 to supply the current through its collector circuit to the relay YB. By actuating the relay YB, its switches $b_1$, $b_2$, $b_3$ and $b_4$ are changed over. By the changeover of switch $b_2$, the base of transistor TR1 is grounded through resistor R9 shunted by capacity C5. The function of this shunt circuit is similar to that of the aforedescribed shunt circuit of resistor 30 and capacitor C12 which are connected to the base of transistor TR7. Thus the transistor TR1 is turned "off," while the transistor TR2 is turned "on," whereby the relay YA is energized through said collector circuit. By activating the relay YA, its switches $a_1$, $a_2$, $a_3$ and $a_4$ are changed and the following circuits will be established.

f. By changing over of switches $a_1$ and $b_1$ Playback amplifier output terminal PL5 - switch PT5 - switch $a_1$ - switch contacts PA4-N-D- switch contacts $b_1$-N-U- resistor R122-speaker SP.

g. By changing over of switch $a_2$

"—B" line - switch PC2 - switch contacts $a_2$-N-L- switch PT4 - "—B" source terminal PL3 of playback amplifier. By this connection, "—B" voltage is supplied to the preamp. of the playback amplifier, while "—B" voltage for the main amplifier is supplied through the terminal PL-4.

h. By changing over of switches $a_3$and $a_4$, primary side's terminal $t_7$ of power transformer $T_7$-switch $a_3$ - switch $PC_7$ - switch PP7 - switch $a_4$ -switch contact $a_4$-L - motor $M_1$ - other terminal 18 of transformer T7. By this circuit arrangement, the motor $M_1$ is now energized to rotate. By the rotation of the motor $M_1$, the magnetic tape housed within the cartridge 17 is driven to reproduce the prerecorded sound thereon through the recording and reproducing head $RH_1$. Reproduced current is supplied from the magnetic head $PH_1$ through switches PT3 and PP1 to the terminal $PL_1$ of the playback amplifier to be amplified. Further, this amplified output power is supplied through the above-mentioned circuit connection (f) to the loud speaker SP, thereby energizing the latter.

When the endless tape has completed nearly one cycle of its reproduction and reaches its tape end, a small conductive foil or strip which is fixed to said tape end closes both contacts $P_1$. By this connection, the circuit which is directed from ground through contacts $P_1$, to the base of transistor TR8, is established, thus the transistor base is grounded and then the transistor TR8 is shut "off," whereby the relay YB is deenergized, so switches $b_1$, $b_2$, $b_3$ and $b_4$ are changed over into their original positions as illustrated in FIG. 5. Further, upon closing contacts $P_1$, the base of transistor TR2 becomes also grounded through switch $st_2$ diode D8 and the contacts P1. Now, the transistor TR2 is in "off" state, so that the relay YA is deenergized, consequently its switches $a_1$, $a_2$, $a_3$ and $a_4$ are restored as illustrated in FIG. 5, and the circuit arrangement (f), (g) and (h) are released as before. The above-described operation will be carried out in the same manner whether the loaded magnetic tape cartridge 17 is one for autoanswer exclusive use or recording use. The user or owner of the apparatus of the present invention may therefore select the proper cartridge in which the desired speech is recorded. Of course, if the loaded cartridge is not the desired one, he may change it to the other one. The sequence of the above-mentioned operation is for when the autoanswer button 10 is pushed after the cartridge 17 is loaded, but by the reverse sequence, i.e., by loading cartridge 17 after pushing the autoanswer button 10, the same operation will occur. This is because the microswitch MS6 is opened when the cartridge 17 is not loaded, but is closed only when loaded, thereby energizing the above-described circuit.

During the reproducing operation of the magnetic tape cartridge 17 (i.e., during the sending operation of the outgoing message through the telephone lines), it sometimes happens that the supplied electric power is interrupted by some unexpected accident. In this case, the operation is stopped, but when power is fed again, the operation continues automatically without any handling and is continued until the tape on which the outgoing message is recorded is stopped again at the initial tape end. Now the apparatus is again ready for sending outgoing messages. Further, during the above-described reproducing operation, switch $b_1$ of relay YB is changed over the side opposite to the diagram as viewed in FIG. 5, so that the circuit connected from the output terminal of the playback amplifier to the transformer T1 is opened and the reproduced sound is not sent out to the telephone lines.

3. Operation of starting control circuit

As described above, when the autoanswering button is depressed and the confirming operation is completed, the apparatus of the present invention is turned into the standby state in which the apparatus is ready for receiving callers. When the telephone rings in the standby state of apparatus of the invention, first the bell signal is supplied from telephone lines $L_1L_2$ through switch $e_1$ of relay YE, and the above-described circuit connection (a), to the input terminals RE1, RE3 of rectifier REC1 and the rectified voltage appears between the rectifier terminals RE2 and RE4. The bell signal, which is normally a low frequency AC current of about 16 c./s., is now changed to a pulsating current of about 16 c./s., when rectified. The pulsating current is smoothed through capacitor C3 and resistor R1, and supplied to constant voltage diode 2D1, to thereby become a constant-voltage current, thus changing capacitor C4.

The time constant circuit is composed of capacitor C4, variable resistor VR1, resistor R7, R8. Any desired value of this time constant is achieved by adjusting the variable resistor VR1. Each of these diodes D1 and D2 serves to prevent direct current from flowing reversely. The reason why the constant voltage regulator diode ZD1 is used in the apparatus of the invention is that by its application, the time interval between the calling signal and the starting operation of the apparatus may be kept constant, in spite of the different conditions of the telephone lines and of the bell signal voltages used in various countries or districts where the apparatus are used. Namely, the time elapsed to attain the predetermined charged voltage of capacitor C4 becomes constant by means of diode ZD1 and the proper selection of the time constant is achieved by variable resistor VR7, resistor R7 and R8. While in the standby state of the apparatus, numerical values of resistors R10, R12 and R13 are selected so that the transistor TR1 may turn "on", but the transistor TR2 is in the "off" state as aforesaid. Now, the capacitor C4 which has been discharged through resistor R8, will be charged gradually, thereby raising its charged voltage. Thus, after a certain predetermined time has elapsed, the potential of junction CN-1 will become positive with respect to the base of transistor TR1 and the diode D2 will also conduct, thereby biasing said diode in the current carrying direction. Now, to the base of transistor TR1, has been supplied a bias voltage with which the transistor TR1, may be turned "off." Thus, concurrently, the transistor TR2 is turned "on" by the turn off action of the so-called Schmitt circuit, whereby the relay YA is energized by collector current of transistor TR2 to change over its switches $a_1$, $a_2$, $a_3$ and $a_4$ to the opposite side and the corresponding circuits connections will be established as follows:

i. By changing-over switch $a_1$

Output terminal PL5 of the playback amplifier-switch PT5 - switch $a_1$ - switch PA4 - switch $b_1$ - transformer T1.

j. By changing over switch $a_2$, the circuit connection is the same as the connection (g): With this connection "—B" voltage is supplied through "—B" line to the preamplifier of playback amplifier.

k. By changing over switches $a_3$ and $a_4$, the circuit is the same as the connection (h); The magnetic tape for the outgoing message may be reproduced. In these conditions, because relay YB is not energized, circuit (PA7 -$b_3$-$M_3$) and (PA7-$b_3$-MS4-R115-D6-SD2) are completed by the closing of switch $a_3$. Thus the timer motor M3 is rotated and the timer plunger SD2 is operated.

Figure 5A:
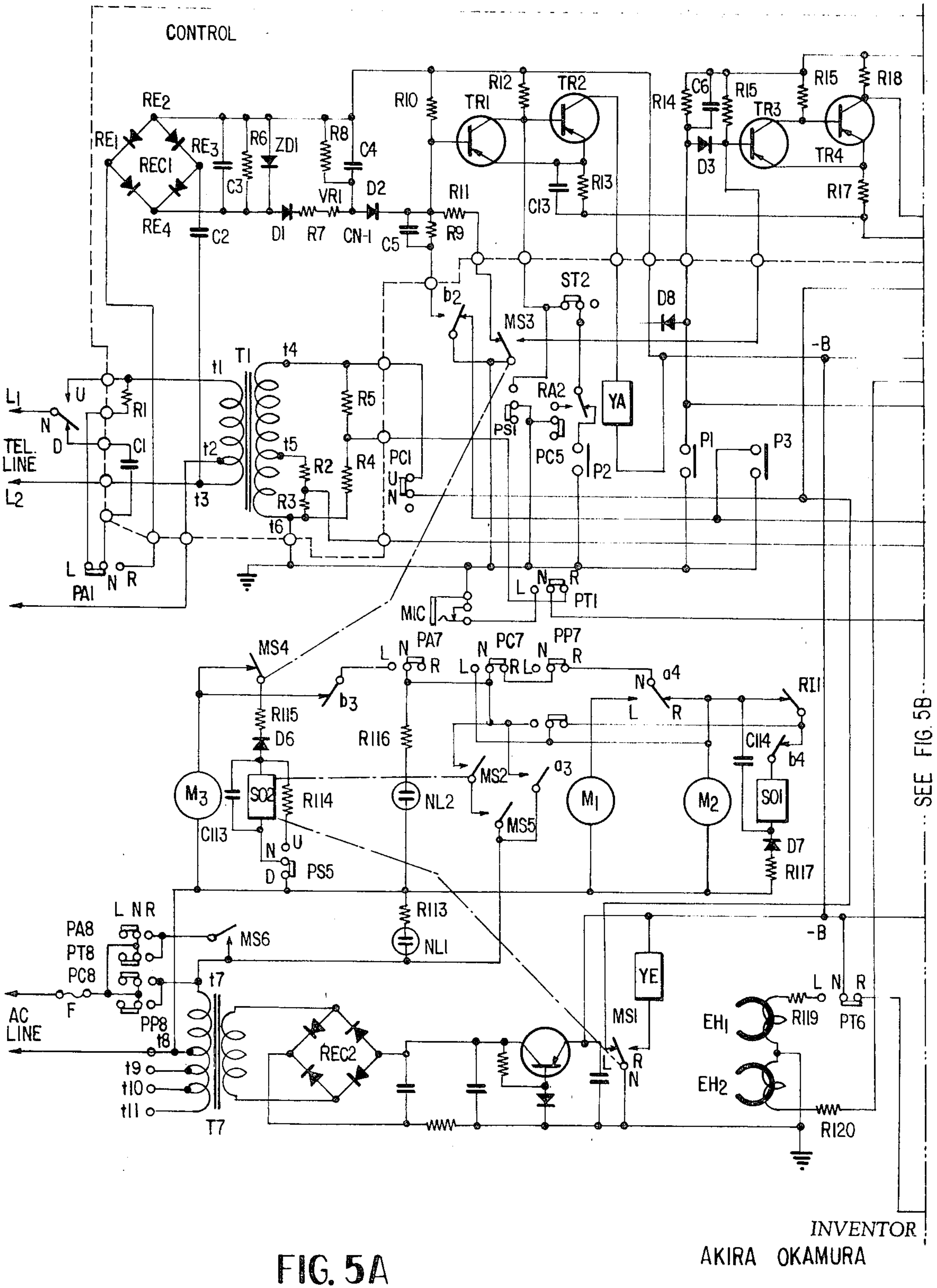
FIGS. 5A and 5B are a schematic circuit diagram of the telephone-answering and message-recording apparatus of the present invention.
Figure 5B:
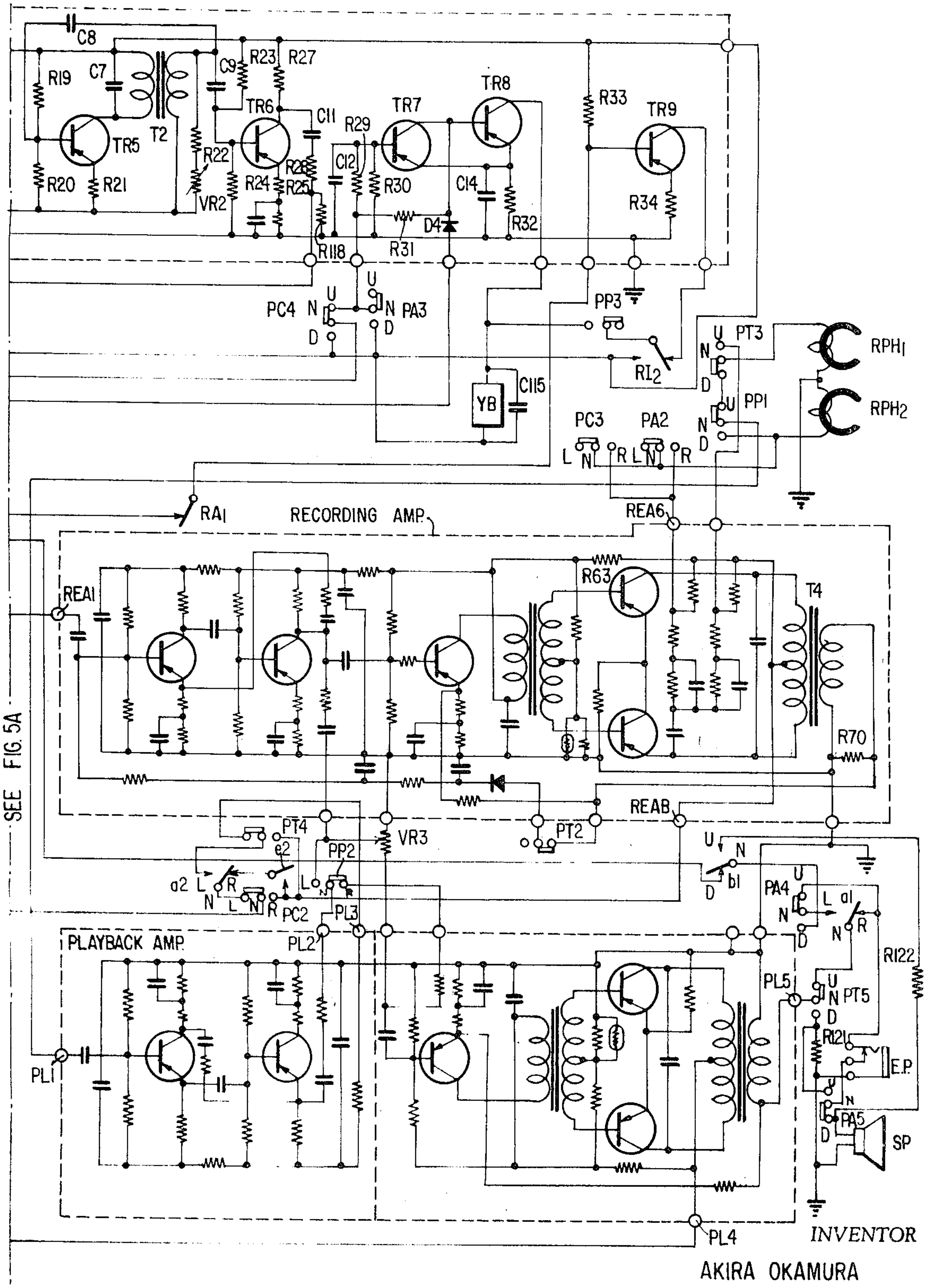

Now microswitches MS1 and MS2 are changed over to the side other than the one shown in the diagram of FIG. 5, by the operation of the timer plunger SD2. Relay YE is then energized, thereby switching over its switch $e_1$ to a contact-U side. Thus the outgoing message is sent out through telephone lines to the caller.

Figure 6:
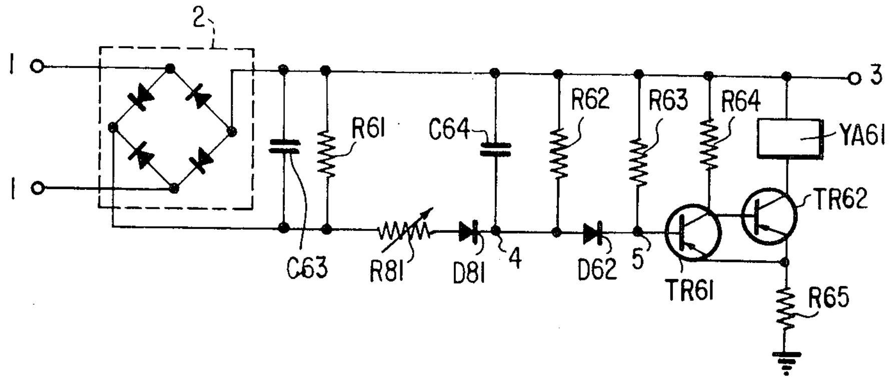
FIG. 6 is a circuit diagram of a modified form of a starting control circuit in the apparatus of the invention.

A diagram FIG. 6 shows a variation of the starting control circuit of the apparatus of the invention in FIG. 5, but simplified by eliminating the constant voltage regulator diode ZD1 in FIG. 5. Capacitor C64 corresponds to capacitor C4 in FIG. 5. This circuit is simpler than that of FIG. 5, and is applicable to stable telephone lines wherein the supplied bell signal voltages do not vary.

According to the starting control circuit of the invention, a unidirectional current is given through the rectifier circuit for a signal call, therefore it is unnecessary to use any large matching transformer and also to use any small matching transformers which may cause some unsuitable higher harmonic output power, in order to transfer the signal call energy to the automatic answering telephone apparatus. Further, it is possible to minimize the fluctuation of delay time with the aid of capacitor C4 which stands ready for receiving the signal call in a substantially noncharged state. Thus, an automatic answering telephone which is easier to be manufactured and controlled and is of good and stable quality will be achieved. Further, better results will be obtained with reference to quality control and productive efficiency for the manufacturers. When a signalling call is interrupted during the predetermined delay time; or a caller hangs up his receiver in the middle of his calling time, the charged capacitor is discharged through a resistance, thus the automatic answering telephone apparatus may not be started and is now ready for the next call with an initial noncharged condition. By utilizing the constant voltage regulator diode ZD1, if the apparatus is applied to the telephone lines through which some unstable bell signal voltage may be supplied, the above-described starting operation may still be easily accomplished.

4. Sending out of Beep Tone and Operation after Sending out the Outgoing Message After the reproduction of the outgoing message has been completed and this reproduced signal has been sent out over the telephone lines, and the tape for outgoing messages has completed one cycle and is at the terminus of its course, the contact points P1 in FIG. 2 are short circuited by the conductive foil fixed at the tape end, and the following circuits will be established:

l. earth-contacts P1 - diode D4 - base of transistor TR8, m. earth-contacts P1 - diode D8 - switch ST2 - base of transistor TR2, with these circuit connections, the bases of transistors TR8 and TR2 are grounded and the recovery action of relay YB and YA is accomplished. Capacitor C6 and the junction of resistor R14 with diode D3 are grounded by the short circuit of contacts P1. Thus, capacitor C6 is charged more and the transistors TR3 is turned "off." When the conductive foil passes through the contacts P1, the same contacts P1 are opened again, and then capacitor C6 is gradually discharged through resistor R14. When the terminal voltage of capacitor C6 returns to its original value, transistor TR turns "on" again. Duration of the "off" times of transistor TR3 are determined by the time constant composed of capacitor C6 and resistor R14. When transistor TR3 turns "off", transistor TR4 turns "on" and the latter transistor's collector becomes grounded through resistance R17 and the oscillation circuit having transistor TR5 which is connected to this collector begins to oscillate. Therefore, during the time determined by the time constant composed of capacitor C6 and resistor R14, the output power of the oscillation circuit is supplied from the secondary side of transformer T2 to the amplifier including the transistor TR6 and is thereby amplified. The amplified output power is sent out to the telephone lines through capacitor C11, resistor R28, conversation button switch PC1 and transformer T1, thereby transmitting the termination of outgoing message to the caller.

The beep tone oscillation circuit of the present invention is composed of the combination of a Schmitt circuit and the oscillation circuit as described above. Relays that are expensive as well as susceptible to malfunction are not used in the apparatus of this invention. Furthermore, the oscillation time of the beep tone is provided by the time constant circuit of the Schmitt circuit, thus the advantage of exact operation and the effectiveness for the telephone autoanswering and recording is increased.

When the cartridge to be used for the outgoing messages the one for "exclusive for outgoing", microswitch MS5 remains opened, so the relay YA is restored by short circuiting of contacts P1, and then the switch $a_3$ is opened as shown in the diagram. Thus, the timer solenoid SD2 is deenergized, and in turn the microswitch MS1 is restored, relay YE is deenergized, and by opening of switches P1, the closing of telephone circuits are released. Thus, the circuit of motor M2 is opened, and also the circuit of motor M1 is opened by changing over switch $a_4$. Now the telephone autoanswering and recording apparatus of this invention is in the standby condition.

Figure 7A:
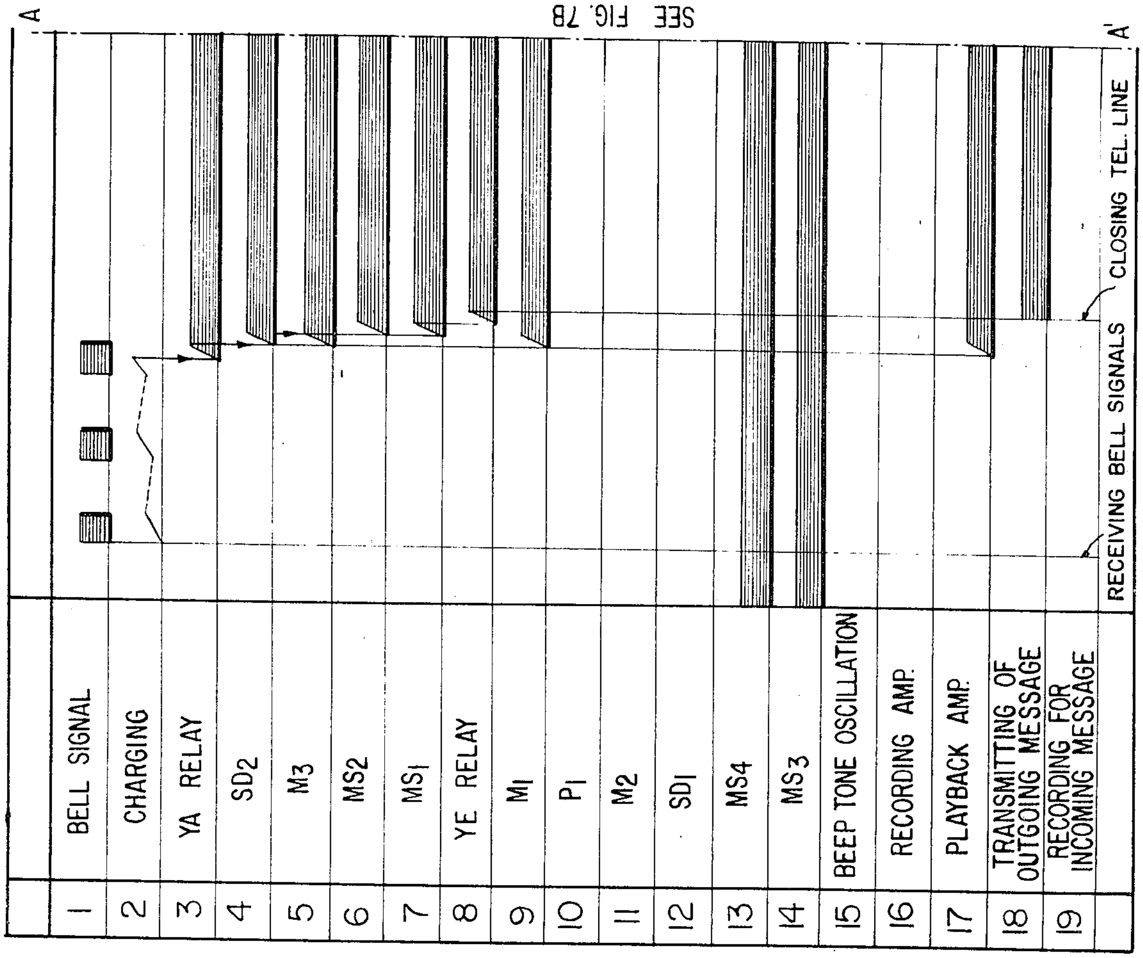
FIGS. 7A and 7B are an operation timetable showing the relation between operation times and operation of main elements, i.e., relays, switches, microswitches, plungers, oscillation circuits, amplifiers and recording and reproducing mechanisms, wherein (a) table is for the answering and recording operation of the apparatus and the (b) table is for answering operation only and shows only the operation occurring at the right side of the line A—A′ in the (a) table. The left side of line A—A′ is the same in table (b).
Figure 7B:
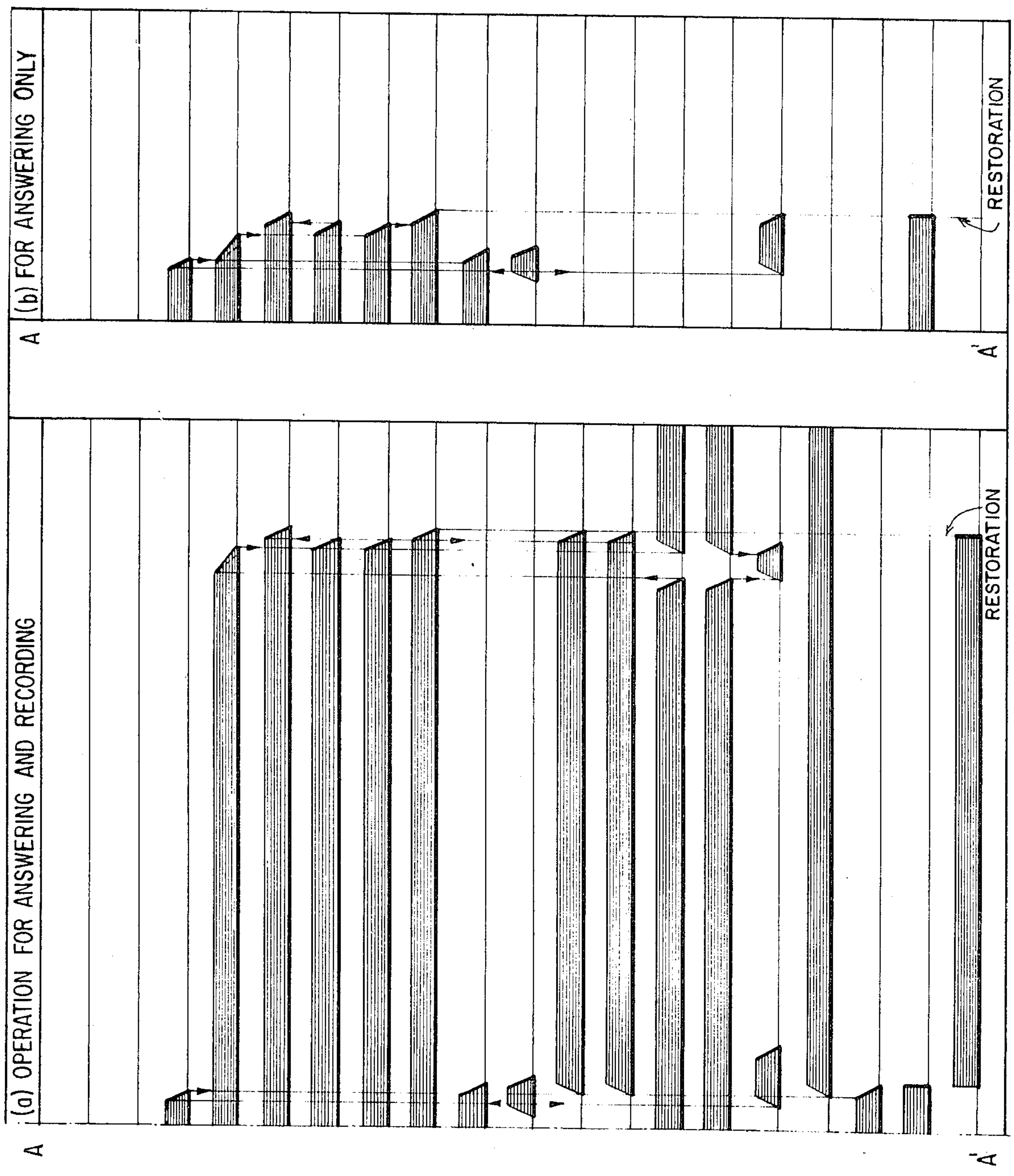

In the operation time table (6) in FIG. 7, the time relation for the termination of each part is shown. When the cartridge for outgoing message is for "recording use," microswitch MS5 is closed, as stated above, therefore during the time solenoid SD2 is operated, the motor circuits are energized. When relay YA is restored and its switch is changed over, the motor M1 is deenergized, while the motor M2 is energized. Now the magnetic tape for incoming messages is placed in the recording condition. In the case where the outgoing message's cartridge is loaded is one for "recording use," the beep tone is generated in the early stage of recording duration as shown in the time table (a) of FIG. 7, and is supplied through resistance R5 connected with the secondary side of transformer $T_1$ to the recording amplifier and then is recorded on the magnetic tape. In the case of reproducing and listening to the recorded incoming message, the recorded beep tone is convenient in that it becomes a partition between messages. The caller sends his message when the beep tone stops. In this instance, by means of the action of the timer, relay YE is operated therefore this message is supplied through switch $e1$ and to the transformer T1 and further through the secondary side of the said transformer T1 to the recording amplifier, and is recorded on the tape for the incoming message.

When the time predetermined by means of the timer has elapsed, i.e., the timer motor M3 is stopped rotating, microswitches MS3 and MS4 are opened for an instant by a projection fixed on the shaft of motor M3 (not shown), thereby deenergizing the timer motor itself as well as the timer solenoid SD2, and also changing-over microswitches MS2 and MS1. When the microswitch MS3 is changed over instantaneously, the transistor TR3 turns "off" in an instant, and the transistor TR4 turns "on," thereby for this instant energizing the oscillation circuit of transistor TR5, and sending this oscillatory tone to the telephone lines through the above-mentioned beep tone transmitter circuit and then noticing the termination of recording time to the caller. In this case, as the relay YE is restored with some delay time after deenergization of the timer solenoid SD2, microswitch MS1 is restored and the beep is set to the telephone lines safely.

When the sending of the end tone (i.e., beep tone) has terminated, the apparatus of the invention is restored completely to the standby condition and is ready for receiving the next call. Thus, the device of the present invention enables one to send the end tones which have not been used previously, and the apparatus then lets the caller know the termination of the recording time to avoid unnecessary conversation and also if the recording of the caller's message is terminated in the midst of the conversation it has the advantage of recording an additional conversation.

As the tape for outgoing message is housed in the cartridge, it is easy to change messages, and also because of the combination of the special construction of the cartridge and its corresponding microswitch regulating the operating conditions of the apparatus of this invention, the utilization of the telephone automatic answering apparatus is extended. Further by confirming the operation of the outgoing messages it prevents the cartridge from being misloaded.

What is claimed is:

1. In an automatic telephone-answering and message-recording system an answering and message-recording apparatus comprising, start means for beginning an answering operation at a predetermined time after a caller signal is received, means for answering a caller with a recorded message, means for recording a caller initiated incoming message and, means, responsive to the physical configuration of a tape carrying means for selectively placing said system in a first mode for only answering a call with a recorded message or a second mode for answering the caller and recording a caller initiated incoming message.

2. The system of claim 1 wherein said means responsive to the physical configuration of said tape carrying means includes a first switch means for coupling said system to an electric power supply in response to the insertion of said carrying means in said apparatus, and second switch means response to the physical configuration of said tape carrying means for selectively placing said apparatus into said second mode of operation.

3. The system of claim 2 further including a tape carrying means placed in operable contact with the answering apparatus, said tape carrying means containing a tape for recording a message to be played back in response to a received caller signal.

4. The system of claim 3 further including means for automatically playing said tape on placing said tape carrying means in operable contact with the answering apparatus to confirm that the tape carrying means placed in the apparatus puts it into the desired mode of operation.

5. The system of claim 1 further including control means responsive to said system being in said second mode for producing a first caller detectable signal at the start of the caller recording period and a second caller detectable signal at a time close to the end of the caller recording period.

6. The system of claim 1 wherein said start means includes means for compensating for differences in the received potential level of caller signals to start said answering operation a constant predetermined time after receiving a caller signal regardless of the strength of said signal.

7. The system of claim 1 wherein said start means includes a rectifier circuit for rectifying said caller signal, a capacitor circuit coupled to the output of said rectifier circuit and a relay circuit responsive to the charge stored in said capacitor circuit for starting the answering operation when the stored charge reaches a predetermined value.

8. The system of claim 7 wherein said rectifier circuit includes a ring-connected rectifier circuit ($REC_1$) and a smoothing circuit having a capacitor ($C_3$) and a resistor ($R_6$) as load impedances of said rectifier circuit; said capacitor circuit means includes a capacitor ($C_4$), a discharging resistor ($R_8$) for discharging said capacitor ($C_4$), auxiliary resistors ($R_7$, $VR_1$) for determining the time constant of said capacitor circuit means, and diodes for preventing the discharge current of capacitor ($C_4$) from backflowing; and said relay circuit means include a Schmitt circuit having two transistor ($TR_1$, $TR_2$) and a relay (YA), said relay being connected in the load circuit of said Schmitt circuit.

9. The system of claim 17 further including a constant voltage regulator ($Z\ D_1$) for providing constant recitified voltage to said capacitor circuit means.

10. The system of claim 1 wherein said control means includes a signal sound generator including a time limit circuit including a time constant circuit and a Schmitt circuit, oscillation circuit means cascade-connected to said time limit circuit, and switch means for starting the operation of said time limit circuit.

11. The system of claim 10 further including tape carrying means, the external configuration of which causes said answering apparatus to switch to said first or second mode of operation when placed in operable relation with said answering apparatus, said tape carrying means including a tape for recording an answering message in response to a caller signal, said tape including a conductive section for placing said apparatus in a standby state whereby a caller signal initiates an answering operation.

12. In an automatic telephone-answering and message-recording system which is operable in one of two modes, said first mode providing answering an incoming call with a recorded message, said second mode providing answering an incoming call with a recorded message and allowing the caller to respond to the answering message with an incoming message said incoming message being recorded for future playback; a tape carrying means for carrying a tape upon which is recorded said answering message, said carrying means being readily removable from said system, said tape carrying means including means formed on the external portion thereof for automatically placing said system in either said first or second mode of operation depending upon the external physical configuration of said carrying means.

* * * * *